United States Patent
Ogasawara et al.

[11] Patent Number: 6,089,723
[45] Date of Patent: Jul. 18, 2000

[54] MOUNTING STRUCTURE OF BASE AND BASE COVER IN DOOR MIRROR FOR AUTOMOBILE

[75] Inventors: Morihiko Ogasawara; Bunji Inagaki, both of Niwa-gun, Japan

[73] Assignee: Kabushiki Kaisha Tokai Rika Denki Seisakusho, Aichi-ken, Japan

[21] Appl. No.: 09/011,685
[22] PCT Filed: Aug. 9, 1996
[86] PCT No.: PCT/JP96/02260
  § 371 Date: Feb. 13, 1998
  § 102(e) Date: Feb. 13, 1998
[87] PCT Pub. No.: WO97/06975
  PCT Pub. Date: Feb. 27, 1997

[30] Foreign Application Priority Data

Aug. 14, 1995 [JP] Japan .................................. 7-206968

[51] Int. Cl.⁷ .............................. G02B 7/82; B25G 3/00; F16D 1/00
[52] U.S. Cl. .......................... 359/872; 359/871; 403/375; 403/408.1
[58] Field of Search ..................... 359/841, 871, 359/872, 876; 248/475.1, 477, 479, 482; 411/149, 150; 403/375, 408.1

[56] References Cited

U.S. PATENT DOCUMENTS 5,007,724 4/1991 Hou .......................................... 359/841
5,813,693 9/1998 Gordon et al. ........................ 403/408.1

FOREIGN PATENT DOCUMENTS

| | | | |
|---|---|---|---|
| 0191494 | 8/1986 | European Pat. Off. | ............... 359/872 |
| 50-001249 | 1/1975 | Japan . | |
| 58-051074 | 11/1983 | Japan . | |
| 6-166357 | 6/1994 | Japan . | |

*Primary Examiner*—Cassandra Spyrou
*Assistant Examiner*—Jennifer Winstedt
*Attorney, Agent, or Firm*—Birch, Stewart, Kolasch & Birch, LLP

[57] ABSTRACT

A structure, for mounting a base (1) and a base cover (3) constituting a stay of an automobile door mirror, which corrects a deformation of the base cover (3), prevent a generation of an air-striking sound, and prevent an increase in thickness of the stay. Concave (10) are formed on the lower surface of the base (1) such that the concave (10) are positioned in the periphery of an mounting hole (9) and circumferentially discontinuous with each other. The base cover (3) has an opening (12) corresponding to a mounting hole (9) of the base (1) and a hook-shaped engaging part (15) erected along the circumference of the opening (12). A tip engaging part (14) of the engaging part (15) is formed with a thickness substantially equal to a depth of the concave (10) of the base (1). The base cover (3) has a first projection (16) circumferentially continuous relative to the base part (13). The base (1) has a second projection (18) which is proximate to the first projection (16) and which is positioned radially outwardly relative to the first projection (16).

2 Claims, 3 Drawing Sheets

MOUNTING STRUCTURE OF BASE AND BASE COVER IN DOOR MIRROR FOR AUTOMOBILE

This application is the national phase under 35 U.S.C. §371 of prior PCT International Application No. PCT/JP 96/02260 which has an International filing date of Aug. 9, 1996 which designated the United States of America, the entire contents of which are hereby incorporated by reference.

TECHNICAL FIELD

The present invention relates to a door mirror for an automobile, and more particularly to a structure for mounting a base and a base cover in the door mirror in which a stay thereof is constituted of the base and the base cover.

BACKGROUND ART

An example of a conventional structure for mounting a base and a base cover in a door mirror is shown in FIG. 5 which is a sectional view. In FIG. 5, a stand 22 for pivotally supporting a visor (not shown) which is a mirror casing of the door mirror is fixed to a base 21 by means of a mounting screw 23 being inserted into the base 21 from a lower side thereof. In this structure, a projection part 25 of the base 21 is fitted in a concave part 26 of a base cover 24 by covering the base cover 24 onto the base 21 from a right side in the figure.

In this structure, the engaging part of the base cover 24 is mounted thereon by a loose fit therebetween in assembling, and the base cover 24, which is a plastic molding product, is liable to deform by heat at time of painting. Therefore, there is a possibility that the upper surface of the base cover 24 is not flush with the upper surface of the stand 22 when the base cover 24 is mounted on the base 21. Also, in this structure, there is a gap which is formed between a head part of the mounting screw 23 and a hole 27 of the base cover 24. Therefore, the gap becomes an entrance and exit of air, so that an air-striking sound is caused thereby.

On the other hand, FIG. 6 shows another example of a mounting structure. In this structure, a base cover 33 is mounted on a base 31 by means of a mounting screw 34 when a stand 32 is fixed to the base 31, so that the base cover 33 and the stand 32 are fixed to the base 31 simultaneously by the mounting screw 34. As a mounting portion, the base 31 has a boss 35 having a surface which is a bit retracted inwardly with respect to an upper surface of the base cover 33. After the base cover 33 is fitted in the boss 35, the mounting screw 34 is tightened through a plain washer 36 and a spring washer 37.

With the structure, it is possible not only to allow the upper surface of the base cover 33 to be flush with the upper surface of the stand 32 by correcting the deformation of the base cover 33, but also to prevent the generation of the air-striking sound. However, because the base cover 33 is installed on the base 31 with the pair of washers 36 and 37 being sandwiches therebetween, the head of the mounting screw 34 is positioned lower by the thickness corresponding thereto than the mounting screw shown in FIG. 5. Therefore, in order to hide the head of the mounting screw 34 from view, it is necessary to lower the lower surface of the base cover 33 up to a position as shown by an imaginary line. As a result, the thickness of the stay increases.

Accordingly, it is difficult to simultaneously satisfy, with the conventional arts, all of the three objects of: correcting the deformation of the base cover, preventing the generation of the air whistling sound, and preventing the increase in thickness of the stay.

DISCLOSURE OF THE INVENTION

The present invention has been made in view of the aforementioned problems. In order to solve the problems, the present invention is intended to provide a structure for mounting a base and a base cover in a door mirror for an automobile, which achieves all the three objects simultaneously.

In order to solve the technical problem, there is provided a structure for mounting a base and a base cover in a door mirror used for an automobile, as described below, according to the present invention.

That is, the mounting structure is constructed so that the base is fixed to a door of the automobile and supports a stand that rotatably supports a visor of the door mirror, in which the base cover covers the base, and in which the base cover is tightened to the base with a mounting screw that tights the stand to the base. And the mounting structure is characterized in that: the base has a mounting hole through which the mounting screw is inserted from below, and the base has a concave part which is provided on a lower surface of the base and which is discontinuous circumferentially around the mounting hole; the base cover has an opening which has a spot facing diameter and which corresponds to the mounting hole of the base and corresponds to the mounting screw, and the base cover has a hook-shaped engaging part, in which the hook-shaped engaging part has a base part which is erected around the opening and has a tip engaging part that is connected to a tip of the base part and that projects radially and inwardly towards the opening, in which the tip engaging part engages the concave part of the base and has a thickness which is substantially equal to a depth of the concave part of the base; and the base cover has a first projecting part which is circumferentially continuous relative to the base part of the engaging part, and the base has a second projecting part which is provided relative to the first projecting part so that the second projecting part is located radially outwardly relative to the first projecting part and is proximate thereto.

In the construction, the tree components of the base, the base cover, and the stand, are simultaneously assembled together by engaging the tip engaging part of the engaging part of the base cover with the concave part which forms on the lower surface of the base and by tightening the mounting screw into the stand through the base cover and the base.

According to the construction, the depth of the concave of the base and the thickness of the tip engaging part of the engaging part are substantially equal to each other. Therefore, the tip engaging part of the engaging part of the base cover, and the lower surface of the base are pressed against each other with the mounting screw, so that a deformation of the base cover which may be caused by a painting or the like, can be corrected by the mounting screw.

Also, the tip engaging part of the engaging part of the base cover is engaged inside the concave part formed on the lower surface of the base. Therefore, the head of the mounting screw is prevented from being positioned downward. Also, the concave parts are provided as being discontinuous circumferentially, and the base has a pressure-receiving surface for the mounting screw which is tightened thereto. Accordingly, the mounting screw can be surely pressed against the lower surface of the base, and the stand can be reliably fixed on the base.

Furthermore, according to the construction, the second projecting part is provided radially outwardly outside the first projecting part and is adjacent thereto. Therefore, while the automobile is running, air is prevented from flowing in between the base and the base cover, thus able to prevent the generation of a whistling sound.

In the construction, it is possible to provide one concave part, or a plurality of concave parts, around each mounting hole of the base. Preferably, the plurality of concave parts of the base are provided relative to the mounting hole so that the concave parts thereof are separate from each other with an equal distance between adjacent concave parts thereof. With the construction, when the base cover is attached to the base with the mounting screw, a part of the base cover with the spot facing diameter, i.e., the engaging part 15, is biased or fixed with respect to the base evenly or uniformly as a whole around the mounting hole. Therefore, even if the base cover is deformed by the painting or the like as described above, the deformation can be corrected effectively.

BEST MODE FOR CARRYING OUT THE INVENTION

A structure, according to an embodiment, shown in FIGS. 1 to 4, of the present invention, for mounting a base and a base cover in a door mirror for an automobile, is described below in detail.

Figure 1:
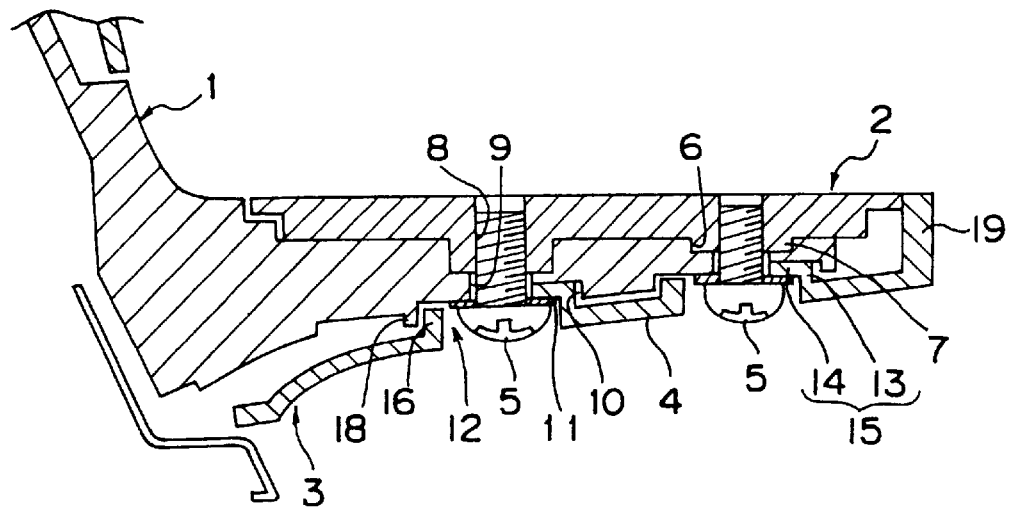
FIG. 1 is a sectional view showing a structure for mounting a base and a base cover in a door mirror for an automobile, according to the present invention.
Figure 2:
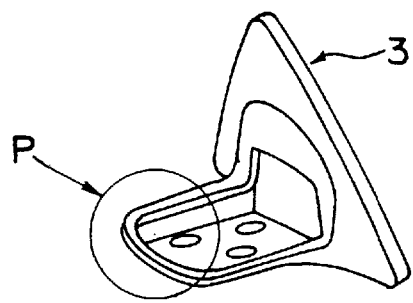
FIG. 2 is a perspective view showing the base cover.
Figure 3:
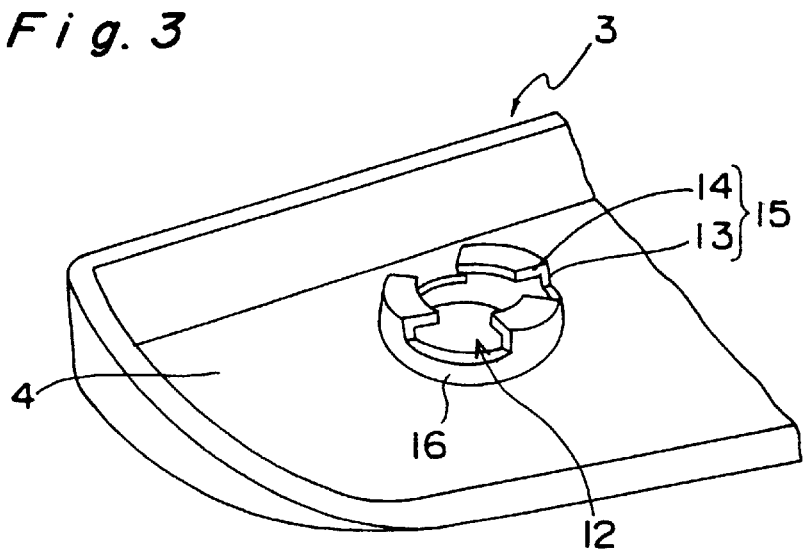
FIG. 3 is an enlarged perspective view of a part "P" in FIG. 2.
Figure 4:
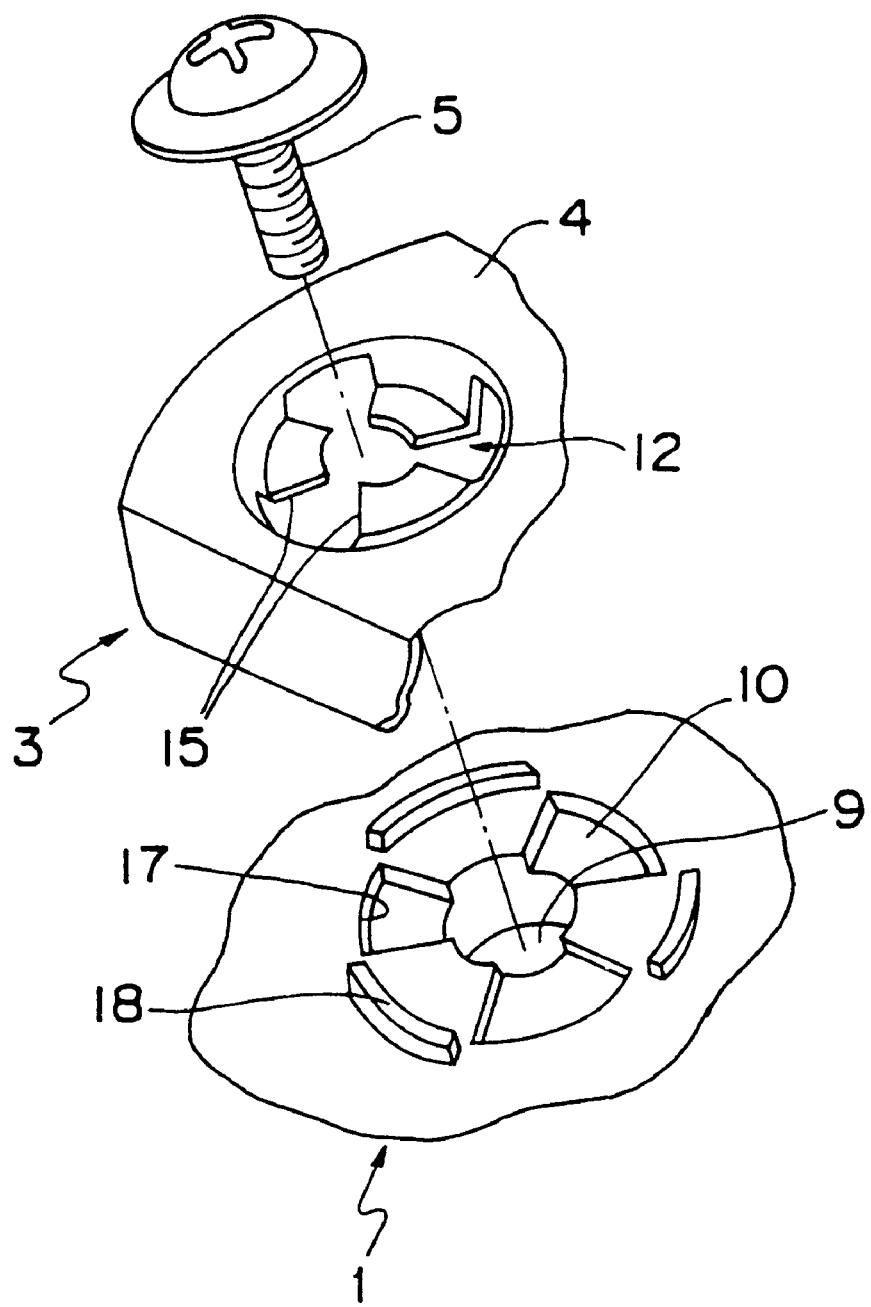
FIG. 4 is an exploded perspective view showing a part of the mounting structure which is viewed from below.
Figure 5:
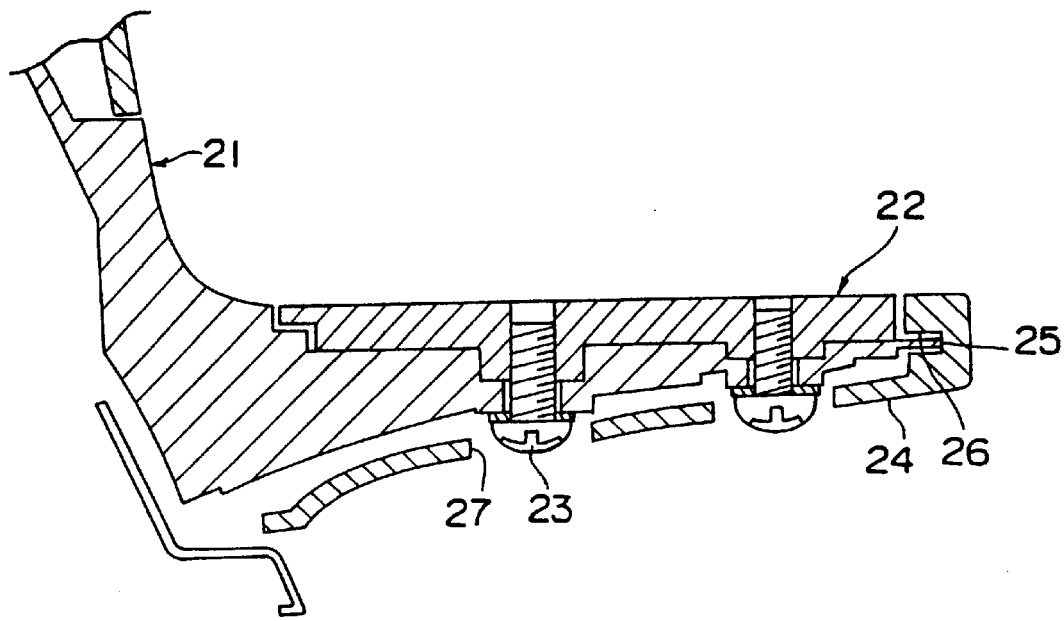
FIG. 5 is a sectional view showing a conventional structure for mounting a base and a base cover.

FIG. 1 is a sectional view showing the structure for mounting the base and the base cover in the door mirror for the automobile; FIG. 2 is a perspective view showing the base cover shown in FIG. 1; FIG. 3 is an enlarged perspective view of a part "P" shown in FIG. 2; and FIG. 4 is an exploded perspective view showing a part of the mounting structure which is viewed from below.

In the drawings, a reference numeral 1 denotes the base which holds a stand 2. The stand 2 rotatably supports a visor (not shown) in the door mirror for the automobile. The base 1 is fixed to a door of the automobile. A reference numeral 3 denotes the base cover which covers the base 1. The base cover 3 has a bottom wall 4 which covers a lower surface of the base 1. The base cover 3 is fastened to the base 1 by means of a mounting screw 5 for fixing the stand 2 to the base 1, so that the base cover 3 and the stand 2 are fixed to the base 1 simultaneously.

As a structure for positioning the stand 2 with respect to the base 1, a concave part 6 is formed on an upper surface of the base 1, and a projection part 7, engaging the concave part 6, is formed on a lower surface of the stand 2. A screw hole 8 is formed on the projection 7 of the stand 2. At least two mounting holes 9 (three mounting holes in the embodiment) for tightening mounting screws 5 into the screw holes 8 are formed through the base 1. By a peripheral wall 19, the base cover 3 is positioned with respect to the base 1 and the stand 2 in a direction in which a plane of the stand 2 exists.

On the lower surface of the base 1, three concave parts 10 are formed, around each mounting hole 9, with an equal interval between adjacent concave parts 10. Each concave part 10 is formed fan-shaped with a central angle of 60°. On the other hand, the bottom wall 4 of the base cover 3 has an opening 12 which has a spot facing diameter (a diameter which is a little bit greater than that of a washer 11) corresponding to the mounting screw 5 and which is formed at a position corresponding to the mounting hole 9 of the base 1. The bottom wall 4 of the base cover 3 also has a hook-shaped engaging part 15. The hook-shaped engaging part 15 has a base part 13 which is erected around the opening 12; and the hook-shaped engaging part 15 also has a tip engaging part 14 which is connected to a tip of the base part 13 and which extends radially and inwardly with respect to the opening 12. The tip engaging part 14 of the hook-shaped engaging part 15 has a thickness which is substantially equal to a depth of the concave part 10 of the base 1. The tip engaging part 14 of the hook-shaped engaging part 15 has a fan shape which substantially corresponds to the fan shape of the concave part 10.

Between the adjacent engaging parts 15 of the base cover 3, a first projection part 16 which connect the adjacent base parts 13 with each other forms along the circumference along which the base parts 13 exist. In the structure, the base part 13 and the first projecting part 16 are integrated with each other to form a cylindrical wall which is continuous in the circumferential direction.

On the other hand, the base 1 has a second projecting part 18 formed thereon. The second projecting part 18 is arcuate in shape and forms along a circumference the diameter of which is a little bit greater than the diameter of an outer edge surface 17 of the concave part 10. The second projecting part 18 is positioned radially outside the first projecting part 16. The second projections 18 are provided in the region in which the concave parts 10 around the mounting hole 9 are not formed. Alternatively, the second projections 18 may be formed continuously circumferentially.

In the aforementioned structure, with the tip engaging part 14 of the engaging part 15 of the base cover 3 being fitted inside the concave 10 formed on the lower surface of the base 1, the mounting screw 5 is tightened into the stand 2 through the opening 12 of the base cover 3 and the mounting hole 9 of the base 1, thus the three components being fixed to each other. The depth of the concave 10 of the base 1 and the thickness of the tip engaging part 14 of the engaging part 15 are generally equal to each other. Therefore, the tip engaging part 14 of the engaging part 15 of the base cover 3, and the lower surface of the base 1, are simultaneously pressed against each other by the mounting screw 5. Accordingly, even though the base cover 3 is deformed, for example, by a painting, the deformation can be corrected by the mounting screw 5, which allows the upper surface of the peripheral wall 19 of the cover 3 to be flush with the upper surface of the stand 2.

Figure 6:
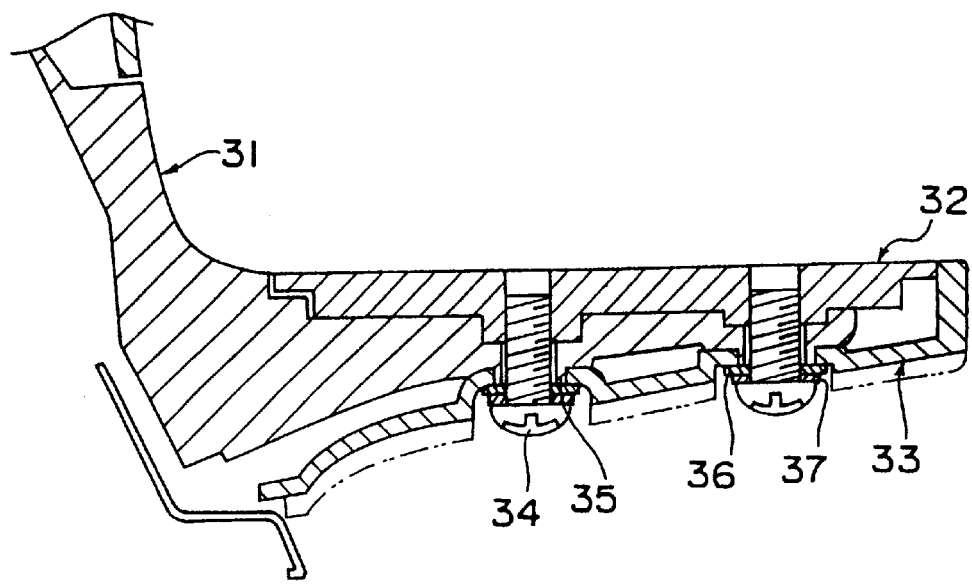
FIG. 6 is a sectional view showing another conventional structure for mounting a base and a base cover.

Also, the tip engaging part 14 of the engaging part 15 of the base cover 3 is engaged inside the concave part 10 formed on the lower surface of the base 1. Therefore, the head of the mounting screw 5 is prevented from being positioned downward by the thickness of the base cover 3, which is different from the prior art shown in FIG. 6. That is, the increase in thickness of the stay is prevented. Further, the region, of the lower surface of the base 1, between the adjacent concave parts 10 is formed as a pressure-receiving surface for the mounting screw 5 which is tightened. Accordingly, the mounting screw 5 can be surely pressed against the lower surface of the base 1, and the stand 2 can be reliably fixed thereon.

According to the aforementioned structure, because there are provided the first projection parts 16 between the adjacent base parts 13 of the engaging part 15 of the base cover 3, and because there are provided the second projections 18 on the base 1, the inflow of air therebetween is prevented, thus able to prevent the generation of a whistling sound.

What is claimed is:

1. A mounting structure in a door mirror used for an automobile, comprising:

a base which is fixed to a door of the automobile;

a base cover which covers the base;

a stand which is supported by the base and which rotatably supports a visor of the door mirror; and a mounting screw which tightens both the base cover and the stand to the base, the base has a mounting hole through which the mounting screw is inserted from below, the base has at least one concave part which is provided on a lower surface of the base and which is discontinuous circumferentially around the mounting hole, the base cover has an opening which has a spot facing diameter and which corresponds to the mounting hole of the base and corresponds to the mounting screw, the base cover has a hook-shaped engaging part, the hook-shaped engaging part has a base part which is erected around the opening and has a tip engaging part that is connected to a tip of the base part and that projects radially and inwardly towards the opening, the tip engaging part engages the at least one concave part of the base and has a thickness which is substantially equal to a depth of the at least one concave part of the base, the base cover has a first projecting part which is circumferentially continuous relative to the base part of the hook-shaped engaging part, and the base has a second projecting part which is provided relative to the first projecting part so that the second projecting part is located radially outwardly relative to the first projecting part and is proximate thereto.

2. The mounting structure as claimed in claim 1, wherein the at least one concave part of the base is a plurality of concave parts that are provided relative to the mounting hole so that the plurality of concave parts thereof are separate from each other with an equal distance between adjacent concave parts thereof.

* * * * *